United States Patent [19]

Zweegers

[11] Patent Number: 4,718,612
[45] Date of Patent: Jan. 12, 1988

[54] MAIZE CHOPPER

[75] Inventor: Petrus W. Zweegers, Geldrop, Netherlands

[73] Assignee: P. J. Zweegers en Zonen, B.V., Geldrop, Netherlands

[21] Appl. No.: 818,829

[22] Filed: Jan. 14, 1986

[30] Foreign Application Priority Data

Jan. 26, 1985 [NL] Netherlands .......................... 8500217

[51] Int. Cl.$^4$ ............................................ B02C 18/22
[52] U.S. Cl. .................................. 241/55; 241/101.7; 241/158; 241/222
[58] Field of Search .................. 241/101.7, 55, 56, 57, 241/222, 158; 56/13.4

[56] References Cited

U.S. PATENT DOCUMENTS

| | | | |
|---|---|---|---|
| 2,848,029 | 8/1958 | West | 241/55 |
| 4,594,841 | 6/1986 | Wistuba et al. | 241/101.7 X |
| 4,597,253 | 7/1986 | Blumer et al. | 241/101.7 X |
| 4,619,410 | 10/1986 | Lenzer et al. | 241/222 X |

FOREIGN PATENT DOCUMENTS 2167233 1/1982 Fed. Rep. of Germany ... 241/101.7

Primary Examiner—Mark Rosenbaum
Attorney, Agent, or Firm—Edmund M. Jaskiewicz

[57] ABSTRACT

A maize chopper has a casing supported by a frame and maize-stalks are supplied to the casing. A chopping wheel has a supporting plate in the casing and rotatable around an axis of rotation and cutting elements are fixed to said supporting plate. Between the casing and a discharge duct joined to the casing brush cutters are arranged in a discharge passage for material discharged by the chopping wheel. Blades are provided at the side of the supporting plate of the chopping wheel turned away from the cutting elements and/or to the brush cutters. The width of the brush cutters, measured in the direction of the axes of rotation of the brush cutters, is smaller than the width of the discharge passage measured in the same direction such that in operation air displaced by the blades can flow beside the brush cutters through the discharge passage to the discharge duct to discharge material from the chopping wheel.

2 Claims, 4 Drawing Figures

MAIZE CHOPPER

The invention relates to a maize chopper provided with a frame with a casing supported by the frame and means for supplying maize-stalks to the casing, whereby a chopping wheel provided with a supporting plate rotatable around an axis of rotation and cutting elements fixed to said supporting plate is located in the casing, and between the casing and a discharge duct joined to the casing brush cutters are arranged in a discharge passage for material discharged by the chopping wheel, such that in operation material discharged by the chopping wheel moves through the brush cutters to the discharge duct.

With such maize choppers the corn-stalks are cut into sections by means of the cutting elements, after which the corn grains present in the material are crushed by means of the brush cutters.

Then the material is to be discharged via the discharge duct, usually into a cart travelling beside or behind the maize chopper.

If no brush cutters are arranged between the chopping wheel and the discharge duct the material thrown into the discharge duct by the chopping wheel usually has sufficient energy of motion to be displaced through the discharge duct and to be deposited from the free end of the discharge duct into the relevant cart. When brush cutters are present, however, practical problems appear to present themselves. When the crop displaced by the chopping wheel is led through the brush cutters the energy of motion supplied to the material by the chopping wheel is hereby lost. The energy of motion needed for displacing the crop through the discharge duct and into the cart must then be supplied by the brush cutters which usually have a comparatively small diameter. Also when said brush cutters are driven with undesired high number of revolutions, however, the energy of motion supplied by said brush cutters still appears to be too little to effect an effective displacement of the crop. It has been suggested, therefore, to provide a ventilating fan behind the brush cutters, seen in the direction of displacement of the material chopped by the chopping wheel, in order to produce an air stream for displacing the material. However, this leads to a heavy and complicated construction of the corn chopper.

It has also been suggested to construct the chopping wheel wider than the brush cutters, seen in the direction of the axes of rotation of the chopping wheel and the brush cutters, respectively, so that part of the crop can be transported to the discharge duct by the chopping wheel without thereby passing the brush cutters, whereby said material not passing through the brush cutters will have to drag along the material processed by the brush cutters. However, when using such a construction, however, part of the maize grains will not be crushed, which is undesired, whilst with such a construction an effective displacement of the material moving through the brush cutters cannot be ensured at all times.

The invention now aims at obtaining a maize chopper of the above mentioned kind, whereby the above disadvantages can be met.

According to the invention this can be achieved because blades have been provided to the side of the supporting plate of the chopping wheel turned away from the cutting elements and/or to the brush cutters, whilst the width of the brush cutters measured in the direction of the axes of rotation of the brush cutters is smaller than the width of the discharge passage measured in the same direction, all this in such a manner, that in operation air displaced by the blades can flow beside the brush cutters through the discharge opening to the discharge duct.

When using the construction according to the invention the side of the chopping wheel turned away from the cutting elements is used as a fan, which, unimpaired by the brush cutters, can produce a strong air stream in the discharge duct for dragging along the material moved through the brush cutters, whilst all material coming from the chopping wheel can thereby be processed by the brush cutters. Because the fan thereby forms part of the chopping wheel no separate space-occupying fan, requiring extra means for supporting and driving, needs to be applied, so that a compact construction of the corn-chopper can be maintained.

The invention will be more fully explained hereinafter with reference to an embodiment of a corn chopper according to the invention diagrammatically illustrated in the accompanying figures.

Figure 2:
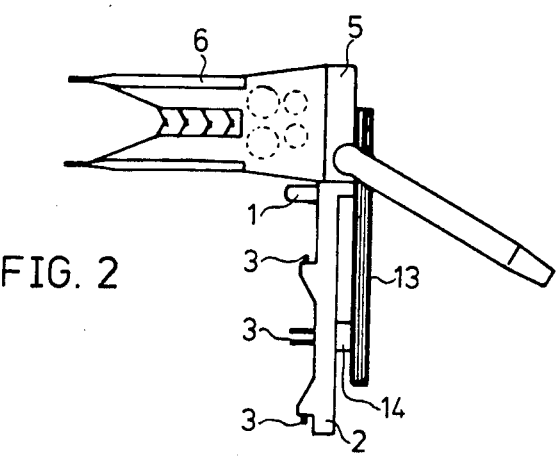
FIG. 2 is a top view of FIG. 1.
Figure 1:
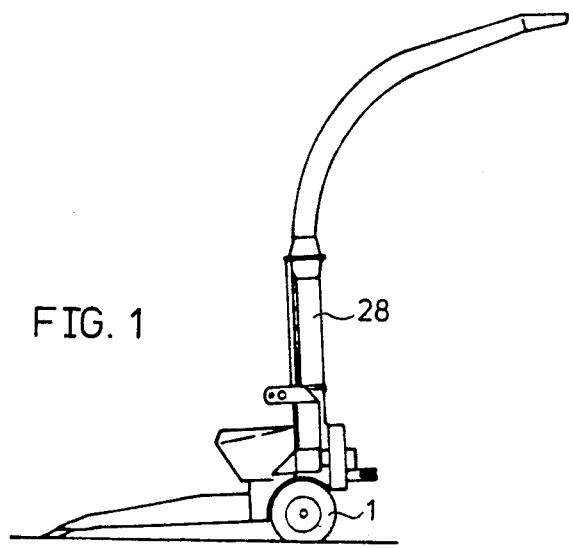
FIG. 1 is a diagrammatic side view of a maize chopper according to the invention.

The device illustrated in FIGS. 1 and 2 comprises a frame 2 supported by ground wheels 1, said frame being provided with coupling elements 3 by means of which the frame can be coupled to the three-point lift of a tractor.

Figure 3:
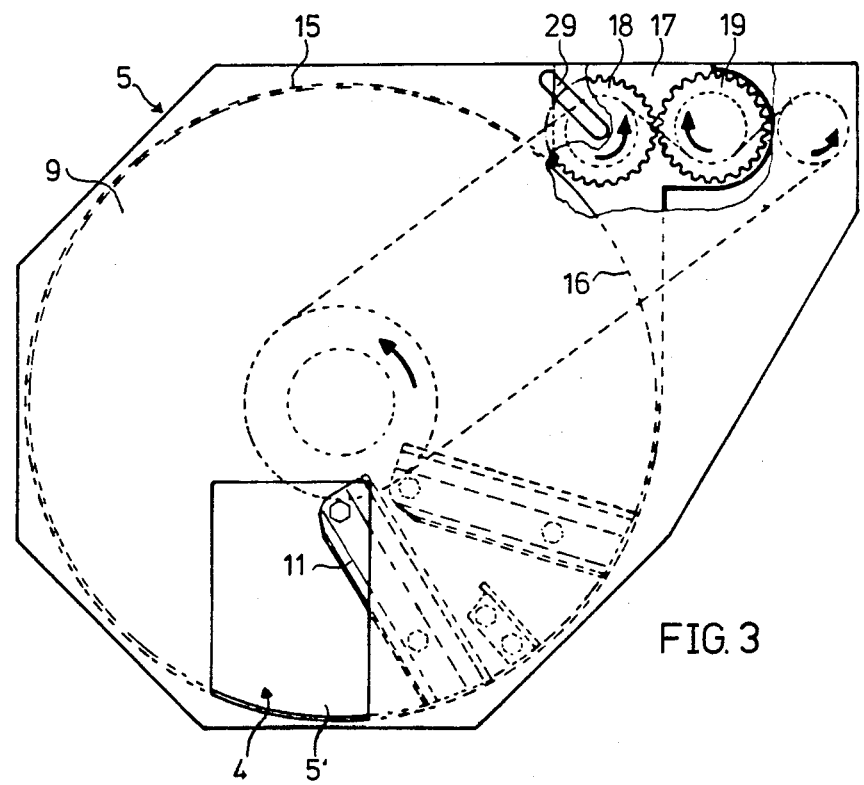
FIG. 3 is a partial view and a partial cross-section of a casing with a chopping wheel and brush cutters accommodated therein.

Joined to one side of the frame 1 is a casing 5 accommodating a chopping wheel 4 (FIG. 3). In front of the casing a supplying device 6, known by itself, has been arranged by means of which corn-stalks can be supplied to the casing 5 via an intake 5' (FIG. 3) provided in the front wall of the casing.

Figure 4:
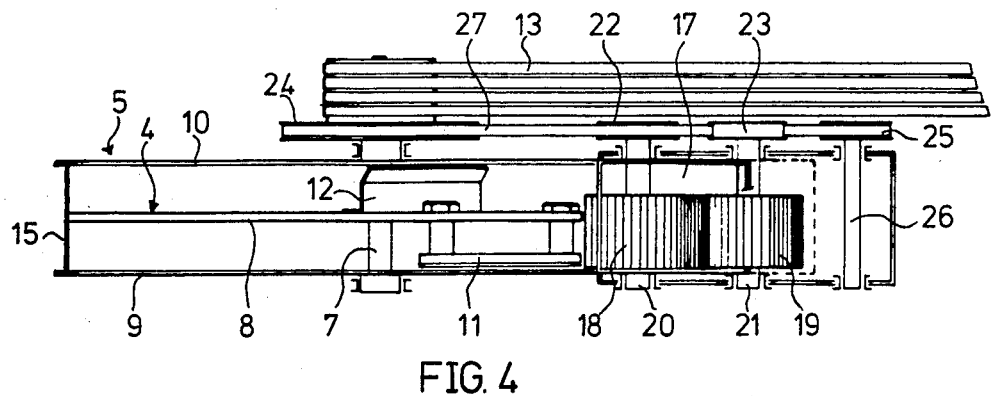
FIG. 4 is a cross-section of FIG. 3.

As is illustrated in FIGS. 3 and 4 the chopping wheel 4 comprises a horizontally arranged shaft 7, accommodated in the casing, to which a supporting plate 8 has been fixed. In the illustrated embodiment the supporting plate 8 is thereby located approximately midway between the front wall 9 and the rear wall 10 of the casing 5.

To the front side of the supporting plate, in a manner known by itself, regularly spaced cutters 11 have been fixed around the axis of rotation of the chopping wheel, only a few of said cutters being illustrated in the figures.

To the rear side of the supporting plate 8 regularly spaced blades 12 have been fixed around the axis of rotation of the chopping wheel 4, only one of said blades being illustrated in FIG. 4.

The shaft 7 has been coupled, via a belt transmission 13, to a shaft which can be coupled to the power take-off of a tractor, which shaft is accommodated in a bearing 14 fixed to the frame 2.

Via an opening 16 provided in the wall 15 surrounding the chopping wheel the room in which the chopping wheel has been arranged is connected with a discharge passage or feed-through room 17, in which a pair of brush cutters 18 and 19 have been arranged. The brush cutters, which are provided with toothed surfaces have been fixed to shafts 20, 21 respectively, extending parallel to the shaft 7 of the chopping wheel, said shafts 20, 21 being journalled in the walls of the casing 5.

Pulleys 22, 23 respectively, have been fixed to the ends of the shafts 20 and 21 that protrude from the casing. A driving belt 27 is guided around said pulleys 22 and 23, a pulley 24 fixed to the shaft 7 and a guide pulley 25, which has been fixed to a shaft 26 accommodated in the casing 5 and extending parallel to the shafts 7, 20 and 21. Joining the discharge passage 17 is and upwardly extending discharge duct 28, constructed in the usual manner, the upper curved portion of which can preferably be swivelled in the usual manner.

In operation the cut-off maize-stalks will be supplied to the inside of the casing 5 by means of the supply mechanism 6 via the intake 5', whereby the maize-stalks are chopped, by means of the cutters 11, into sectins of a certain desired length. Said chopped sections are thrown by the chopping wheel 4, via the opening 16 provided in the casing 5, into the pinch between the two brush cutters 18 and 19 which in particular will crush the maize grains present in the crop. Because the wall 15 closely surrounds the supporting plate 8 of the chopping wheel it is prevented that the chopped material gets into the room accommodating the blades 12.

As is further illustrated in FIG. 3 the shaft 20 of the brush cutter 18 may be located in slotted holes 29, so that the distance between the brush cutters 18 and 19 is adjustable.

The crop moving through the brush cutters 18 and 19 is deposited into the discharge duct 28 by the brush cutters.

During the rotation of the chopping wheel the blades 12 mounted on the chopping wheel will act as a fan and generate an air stream, which, seen from the front wall 9 of the casing 5, will move behind the brush cutters 18 and 19 through the discharge passage 17 to the discharge duct 28. Said air stream will provide an effective displacement of the crop thrown into the discharge duct 28 by the brush cutters 18 and 19, such that the crop can be discharged through the discharge duct 28 in the usual manner and be deposited into a cart travelling behind or beside the corn chopper.

Possibly the blades for generating the air stream may be fixed to the brush cutters. Naturally it will also be possible thereby to use a combination of blades fixed to the chopper wheel and of blades fixed to the brush cutters.

I claim:

1. A maize chopper comprising a frame and a casing supported by said frame, means on said frame for supplying maize-stalks to said casing, a rotatable chopping wheel within said casing and having a supporting plate, said casing having front and rear walls and said supporting plate being disposed substantially midway therebetween, a discharge passage connected to said casing and a discharge duct connected to said discharge passage, rotatable brush cutter means disposed in said discharge passage and having axes of rotation parallel to the rotary axis of said chopping wheel, cutting elements on one side of said chopping wheel supporting plate and fan blades on the other side of said supporting plate, the length of said brush cutter means measured in the direction of axis of rotation thereof being less than the dimension of the discharge passage measured in the same said direction to define an unimpaired passage sufficiently large to accommodate an airstream to provide an effective displacement of the crop thrown into the discharge duct by said brush cutter means such that in operation said fan blades generate said air stream behind said brush cutter means as seen from said front wall through said discharge passage to said discharge duct.

2. A maize chopper as claimed in claim 1 wherein said brush cutter means has front ends located in substantially the same plane as the front end of the cutting element side of said chopping wheel, said brush cutter means having rear ends extending substantially to said other side of said supporting plate of said chopping wheel.

* * * * *